(12) United States Patent
Antoun

(10) Patent No.: US 6,216,151 B1
(45) Date of Patent: Apr. 10, 2001

(54) SAVING CONNECTION TIME BY OBTAINING RESULT OF REQUEST AT LATER RECONNECTION WITH SERVER SUPPLIED ASSOCIATED KEY

(75) Inventor: Selim Zoher Antoun, San Diego, CA (US)

(73) Assignee: BEA Systems, Inc., San Jose, CA (US)

( * ) Notice: Subject to any disclaimer, the term of this patent is extended or adjusted under 35 U.S.C. 154(b) by 725 days.

(21) Appl. No.: 08/571,644

(22) Filed: Dec. 13, 1995

(51) Int. Cl.[7] ....................................... G06F 15/16
(52) U.S. Cl. .......................... 709/203; 709/219; 709/227
(58) Field of Search ...................... 395/200.03, 200.09, 395/226, 235, 237, 200.12; 709/203, 227, 219

(56) References Cited

U.S. PATENT DOCUMENTS 3,976,840 * 8/1976 Cleveland et al. ................. 379/93.02
4,412,287 * 10/1983 Braddock, III ......................... 705/37
5,262,942 * 11/1993 Earle ..................................... 705/37
5,491,820 * 2/1996 Belove et al. ........................... 707/3

* cited by examiner

Primary Examiner—Kenneth S. Kim
(74) Attorney, Agent, or Firm—Fliesler Dubb Meyer & Lovejoy LLP

(57) ABSTRACT

A method, apparatus, and article of manufacture for providing connectionless processing of client requests in a client-server computer system is disclosed. After forming a client-server connection, a client sends a request to a server. A key is associated with the request for identifying the request. The client-server connection is then terminated. The server processes the client request and produces a result, which the server stores for later reporting to the client. At a later point in time, a second client-server connection is formed. The client transmits the previously assigned key to the server. The server retrieves from storage the result from the earlier-processed request and transmits the result to the client.

26 Claims, 5 Drawing Sheets

SAVING CONNECTION TIME BY OBTAINING RESULT OF REQUEST AT LATER RECONNECTION WITH SERVER SUPPLIED ASSOCIATED KEY

BACKGROUND OF THE INVENTION

1. Field of the Invention

The invention relates in general to client-server computer systems, and more particularly, to reducing the connection time between clients and servers in a client-server computer system.

2. Description of Related Art

Computers are increasingly being used in the client-server configuration. In a client-server configuration, multiple computers are interconnected by a communication network. Certain computers are clients and other computers are servers. A client generates process requests, which are communicated to a server for processing. That is, a client generates requests and a server processes client requests. A particular computer can at times be a client and at other times a server.

One application of the client-server architecture is online transaction processing. Airline reservation and banking systems are classic examples of online transaction processing.

A principal advantage of the client-server architecture is the sharing of resources. Data, application programs, data storage devices, processing power, printers, communication subsystems, etc. can be shared. The client-server architecture also makes it possible to keep a centralized database, which is shared, as opposed to maintaining multiple copies of the same data with the overhead of insuring that the data remains consistent at all locations.

With continuing improvements in computer and communications technologies, the client-server architecture is being increasingly utilized. Computers can now be interconnected with local area networks and wide area networks, including wired telephone lines, cellular systems, satellite communication links, etc. The increased speed of communication networks that has been achieved have expanded the practical applications of client-server systems.

Furthermore, improvements in distributed servers, in which multiple computers act as servers that individually or together process client requests, have increased the applicability of the client-server architecture. For example, a distributed transaction processing system is possible. Furthermore, recent development of industry standards and client-server management software have made open distributed systems possible. In an open system, various types of computers running under various operating systems can be interconnected to form a distributed client-server system. This makes it possible for a client to have at its disposal a wide variety of computer resources. For example, TOP END®, available from AT&T Global Information Solutions Company, is a client-server management system that makes open distributed transaction processing possible.

One significant cost associated with the client-server architecture is the cost of maintaining the connection between clients and servers. In client-server systems, when a client generates a request, the request is transmitted to a server via a communication network that interconnects the client and server computers. The client remains connected to the server via the communication network while the server processes the request. When the server completes processing the request, the server transmits a response message to the client. By maintaining an online connection between the client and the server, the client receives the response message as soon as the processing of its request is complete.

The costs associated with the online connection include communication network time (e.g., satellite, telephone line, and/or cellular communication links) and processor and memory overhead associated with the connection. Furthermore, as more clients are simultaneously connected to a server system, the bandwidth of the communication network must be increased to accommodate the many clients.

In some applications the client does not need a prompt result for its request. Furthermore, in some applications a client request takes a long time to process. In such and other applications the online connection time cost may be unnecessary overhead.

It can be seen then that there is a need for reducing the client-server connection costs while still providing the advantages of the client-server architecture.

SUMMARY OF THE INVENTION

To overcome the limitations in the prior art described above, and to overcome other limitations that will become apparent upon reading and understanding the present specification, the present invention discloses a method, apparatus, and article of manufacture for providing connectionless processing of client requests in a client-server environment. In accordance with the invention, to process a client request, a client-server connection is formed and a request is transmitted from a client to a server. A key is assigned to the client request to identify the request. The client-server connection is terminated to eliminate connection time while processing of the client request. The server processes the client request and produces a result for the client. The server stores the result for later reporting to the client.

In accordance with further aspects of the invention, sometime after the client request is processed, the client reconnects to the server. The client sends a message, including the earlier assigned key, to the server requesting the results of the client's earlier request. In response, the server sends the stored result to the client.

In accordance with further aspects of the invention, in one embodiment the key assigned to the client request is generated by the server and is sent to the client for the client's later use in requesting the result of the request. In an alternative embodiment, the client generates the key and sends the key to the server.

In accordance with still further aspects of the invention, the connectionless processing of client requests is an option that may be specified as an alternative from maintaining a client-server connection while processing client requests. In accordance with certain aspects of the invention, the client specifies the connectionless processing option within the client request to the server. Further aspects of the invention will become apparent upon reading and understanding the present specification.

As will be appreciated from the foregoing brief summary of the invention, one object of the present invention is to reduce the client-server connection time in client-server environments. Another object of the present invention is to reduce the processor and memory overhead associated with client-server connections. Another object of the present invention is to reduce the client-server connection time while maintaining the advantages of client-server environments. Further objects of the invention will become apparent upon reading and understanding the present specification.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

Figure 1:
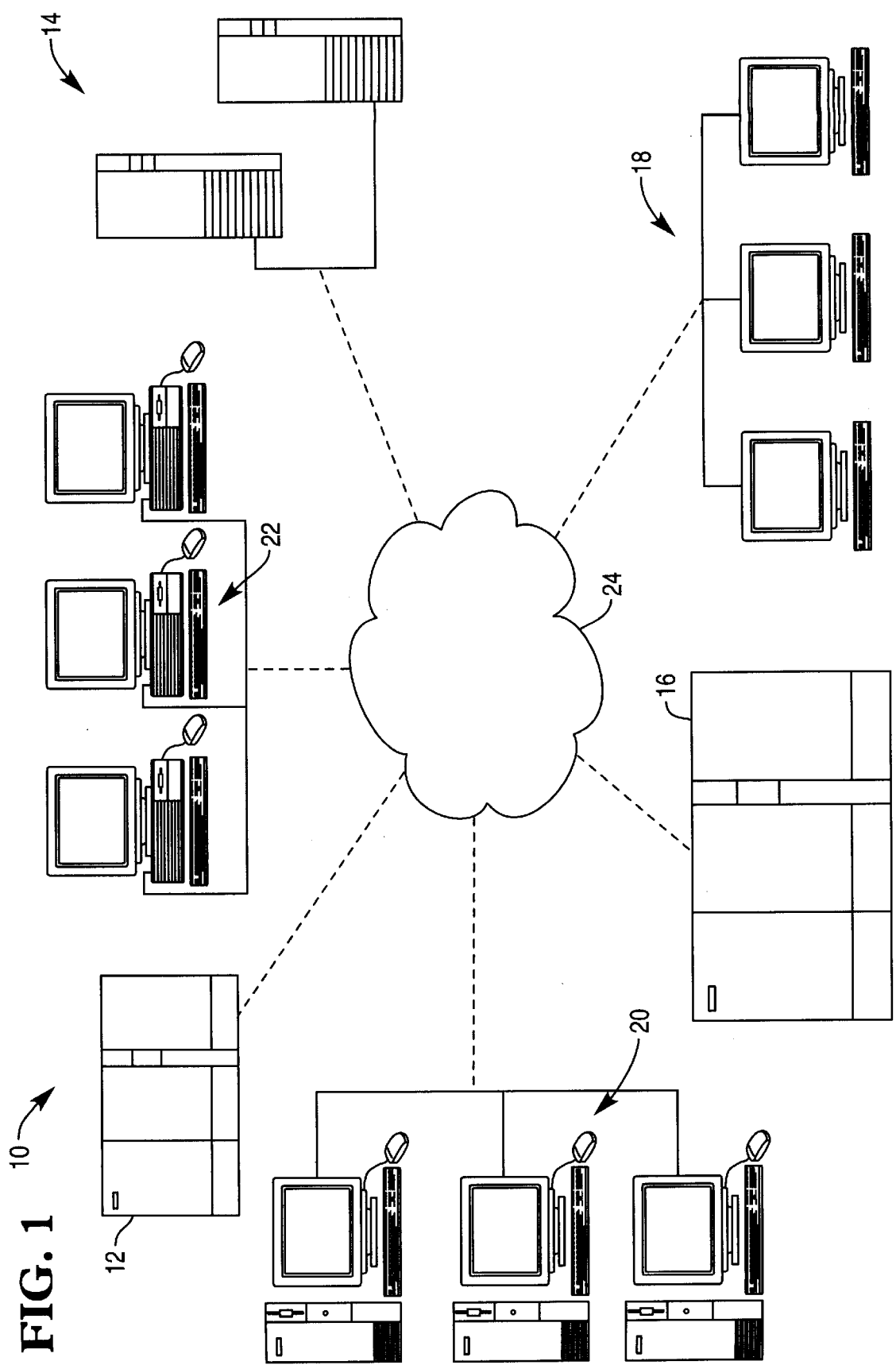
FIG. 1 is a pictorial diagram of a client-server system with which the present invention can be used.

In the following description of the exemplary embodiments, reference is made to the accompanying drawings which form a part hereof, and in which is shown by way of illustration specific embodiments in which the invention may be practiced. It is to be understood that other embodiments may be utilized as structural changes may be made without departing from the scope of the present invention.
Environment FIG. 1 illustrates an exemplary client-server computer system 10 that could be used with the present invention. The system 10 includes: servers 12, 14 and 16; clients 18, 20 and 22; and a communication network(s) 24 which interconnects the servers and the clients. The clients illustrated are work stations 20, personal computers 22, and terminals 18. Other clients, for example, laptop computers and personal digital assistants, are also possible. The servers are illustrated as mainframe and mini computers, however, other computers, including smaller computers, could also take the role of a server. The communication network 24 can be comprised of many types of communication networks including local area networks and wide area networks, such as wired telephone lines, a cellular telephone network and a satellite link. The communication network 24 could be made up of multiple networks of different types.

In the client-server system, the clients 18, 20, 22 generate requests that are processed by the servers 12, 14, 16. The requests are transmitted from a client 18, 20, 22 to a server 12, 14, 16 via the communication network 24. The servers 12, 14, 16 process the request and a response message is sent back over the communication network 24 to the client that made the request. For example, one of the personal computers 22 can send a request to the server 16 over the communication network 24. In prior art client-server systems, the client 22 remains connected to the server 16 while the server processes the client request. The costs of this connection time can be significant, as described above.

Software, running on both the clients 18, 20, 22 and the servers 12, 14, 16, together with communication hardware, makes communication between the clients and the servers possible. This client-server management software has been referred to as middleware. Various client-server management software packages are commercially available. For example, TOP END® is available from AT&T Global Information Solutions Company. Other companies' packages include: Tuxedo, available from the Novell Company; Encina, available from the Transarc Company, now owned by IBM; CICS/6000, available from IBM; Peer Logic; Noblenet; System Strategies; and others.

The servers 12, 14, 16 can work individually, each as a separate server. In that case, a client 18, 20, 22 would connect to one of the servers 12, 14, 16, and any client requests would be sent to and processed by that server. Alternatively, the servers 12, 14, 16 can work together to form a server system, which appears as a single server to the clients. A client request can be processed wholly by one of the servers 12, 14, 16, or the request can be subdivided so that parts of the request are processed by different ones of the servers 12, 14, 16. In this case, the server system is a distributed server. For example, the server management software included in TOP END® supports a distributed server.

Figure 2:
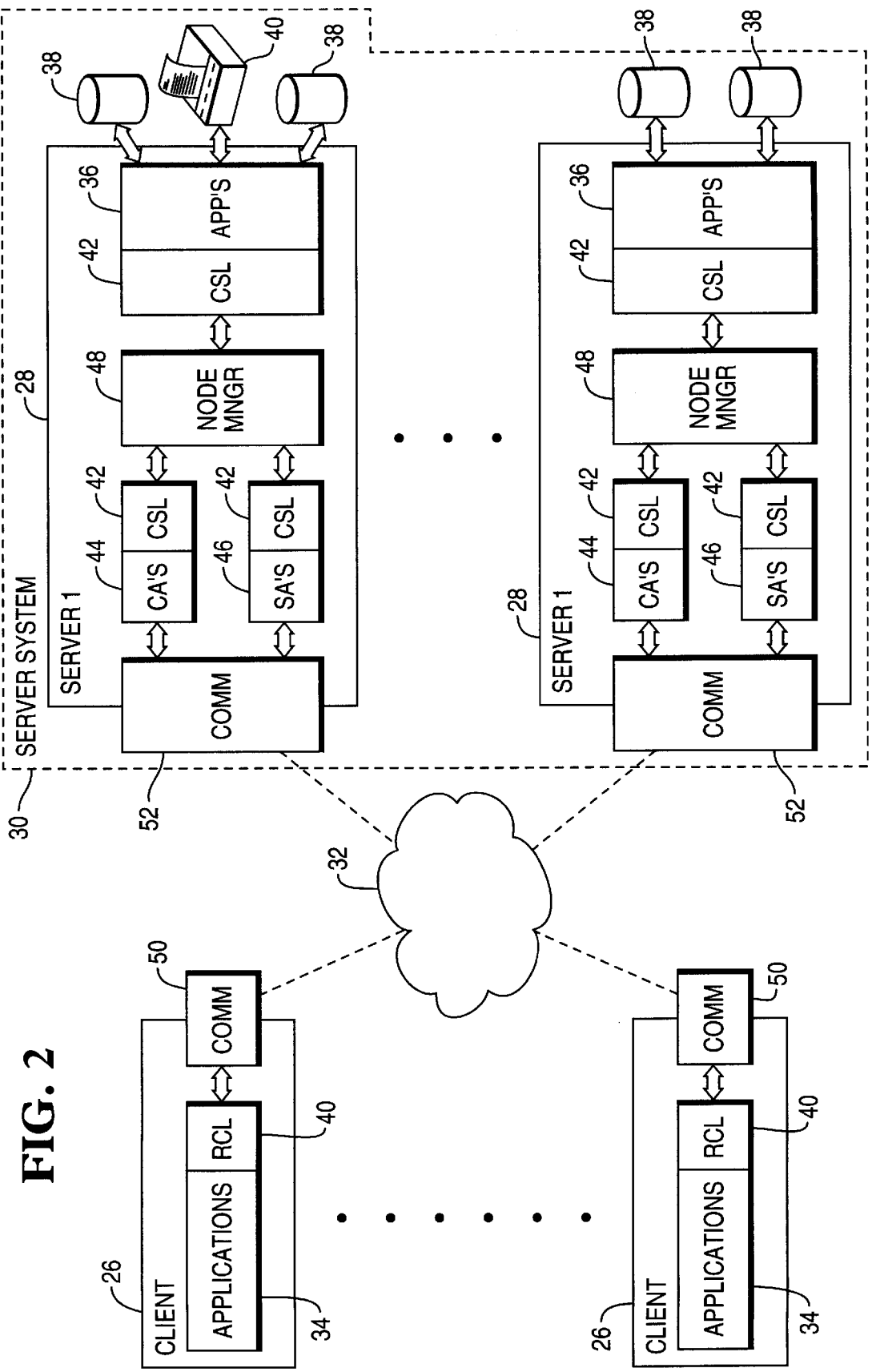
FIG. 2 is a block diagram of a client-server system including software components with which the present invention can be used.

FIG. 2 depicts the software components on clients 26 and servers 28 in one preferred embodiment of the invention. The servers 28 are interconnected to form a server system 30, i.e., a distributed server. In the following, it will be understood that when reference is made to a server the reference refers to either an individual server 28 or the server system 30. The clients 26 and the servers 28 are interconnected by a communication network(s) 32.

Two types of software components are present on the clients and servers: applications and middleware. The client applications 34 make requests of the server applications 36 by way of the middleware. Example applications include an airline reservation system, a car reservation system, a banking system, and others. The server applications 36 can access external components such as hard drives 38 containing databases and other forms of data, printers 40, etc. Each server application 36 can be made up of multiple functions or services, for example, a payroll function in an accounting application.

The middleware, such as that provided by TOP END®, is split between the clients 26 and the servers 28. On the remote client side, the middleware is made up of a remote client library (RCL) 40 of routines. The server portion of the middleware includes: a client-server library (CSL) 42; client agents 44; server agents 46; and a server node manager 48. Communication hardware 50, 52, along with supporting firmware and/or software, is included on the clients 26 and the servers 28 to provide an interface with the network 32. For example, the communication hardware 50, 52 could include modems, network cards, etc.

Each of the client applications 34 is linked to the remote client library (RCL) 40. The client applications 34 call routines in the remote client library to communicate with the server. The server applications 36 are linked to the client server library (CSL) 42, and the server applications call routine in the client server library in communicating with clients and other servers.

For each client-server communication session, a client agent (CA) process or thread 44 is created on a server 28. A client agent 44 acts as the agent of a client 26 in that client middleware commands, e.g., a client send request, are passed from the client 26 over the network 32 to the corresponding client agent 44. In turn, the client agent carries out the command on behalf of the client, utilizing routines available in the client-server library (CSL) 42.

The node manager 48 routes client requests to the appropriate server application 36. A particular server (or node) communicates with other servers through the server agents (SA) 46 and the communication network 32. The node manager 48 routes client requests to an application 36 on the same server 28 or on a different server 28 via a server agent 46 and the communication network 32. Thus, when a client 26 is connected to a single server 28, the client can request services on another server 28: the client request is routed by the node manager 48 to the appropriate server.

The middleware illustrated in FIG. 2 is described in greater detail below in conjunction with FIGS. 4 and 5. But first, the steps performed by the client and server applications 34, 36 in providing connectionless processing of client requests in accordance with one preferred embodiment of the invention are described with reference to FIG. 3.

Connectionless Processing

Figure 3:
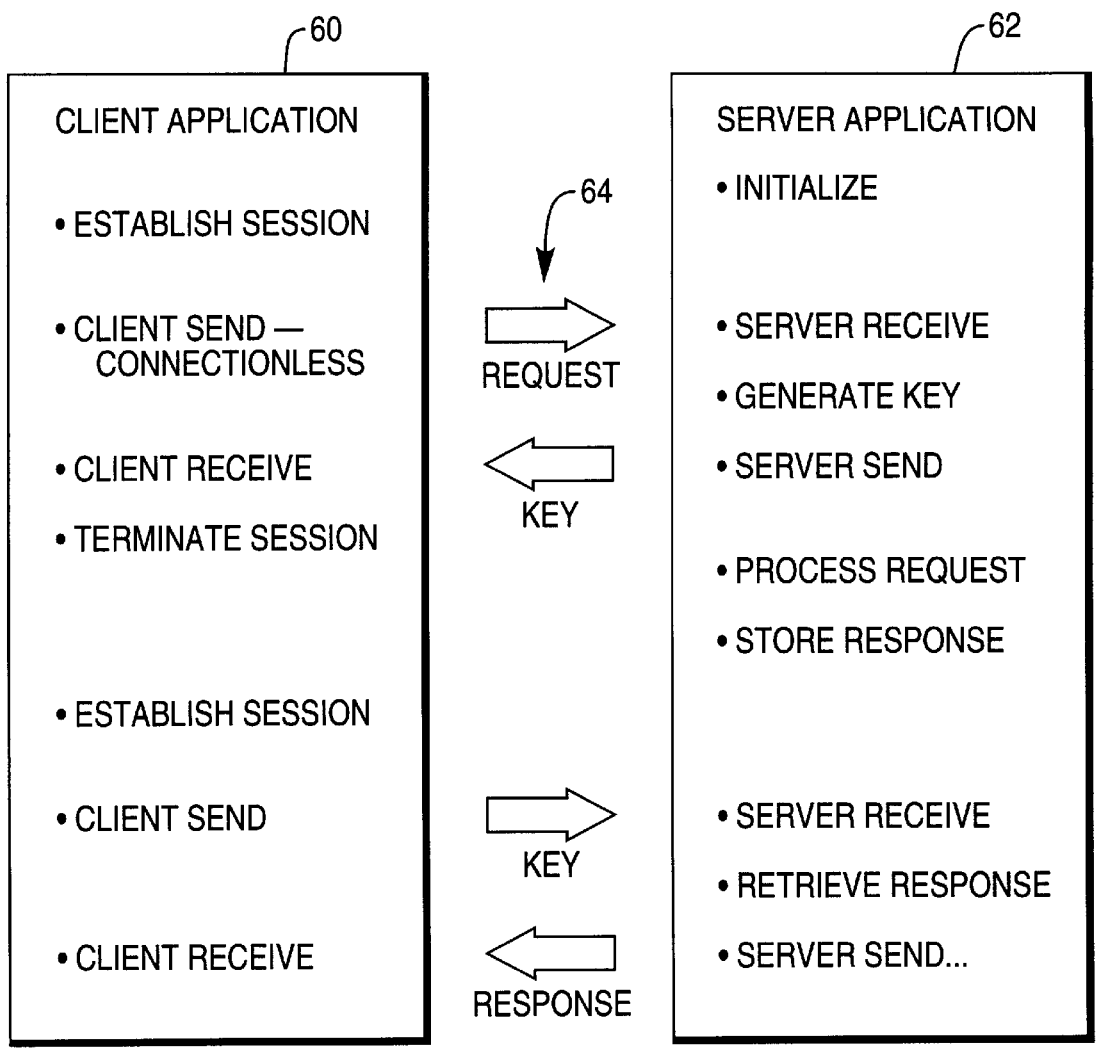
FIG. 3 is a flow diagram illustrating steps performed by a client application and a server application to achieve connectionless processing of client requests in accordance with the present invention.

The process flow of providing connectionless processing of client requests is illustrated in FIG. 3. The steps performed by the client application 60, the steps performed by the server application 62, and the information 64 passed between the client and server applications 60 and 62 are shown.

When the server application 62 is started, it performs an initialization to ready the server to process client requests, as indicated by the INITIALIZE step.

When the client application 60 is started, it establishes a client-server session with the server application 62, as indicated by the ESTABLISH SESSION step. Prior to, or as part of, this step, a communication link is formed between the client 26 and the server 28 over the communication network 32 by, for example, having a modem on the client dial up a modem on the server 28. In the ESTABLISH SESSION step, an initialization message is sent to the server, to start the client-server session.

Next, the client application 60 sends a message that includes a request to the server, as indicated by the CLIENT SEND step. In the preferred embodiment depicted in FIG. 3, connectionless processing of client requests is an option, as illustrated in greater detail in conjunction with FIGS. 4 and 5 below. Accordingly, the request message includes an indication that connectionless processing is desired.

The server application 62 then receives the request message, as indicated by the SERVER RECEIVE step. The server application parses the message to determine what action to take. After the server application determines that the connectionless option is specified, the server application generates a key to associate with the client request, as indicated by the GENERATE KEY step. The server application then causes a return message that includes the key to be sent to the client, as indicated by the SERVER SEND step.

The client application receives the return message, as indicated by the CLIENT RECEIVE step. Upon receipt of the key, the client application terminates the client-server session, as indicated by the TERMINATE SESSION step. This includes sending a termination message to the server. Also, the communication link between the client and the server is ended, e.g., modems hangs up, unless the communication is still needed for some reason.

With the client-server session terminated, the server application processes the client request by performing any steps needed to fulfill the request, as indicated by the PROCESS REQUEST step. As part of processing the request, the server application generates a response for the client. Rather than sending a message reporting the response to the client 26, the server 28 stores the response, e.g., in a database on a hard drive 38, indexed by the key associated with the request.

At some later point in time, the client re-establishes the client-server session, as indicated by the ESTABLISH SESSION step. The client application then sends a message, containing the key assigned to the previously made request, as indicated by the CLIENT SEND step. The server application receives the message, as indicated by the SERVER RECEIVE step, and then parses the message. Upon identifying the key included in the message, the server application retrieves the earlier stored response, as indicated by the RETRIEVE RESPONSE step. The server application then sends the response to the client, as indicated by the SERVER SEND step. The client application then receives the message, as indicated by the CLIENT RECEIVE step.

Figure 4:
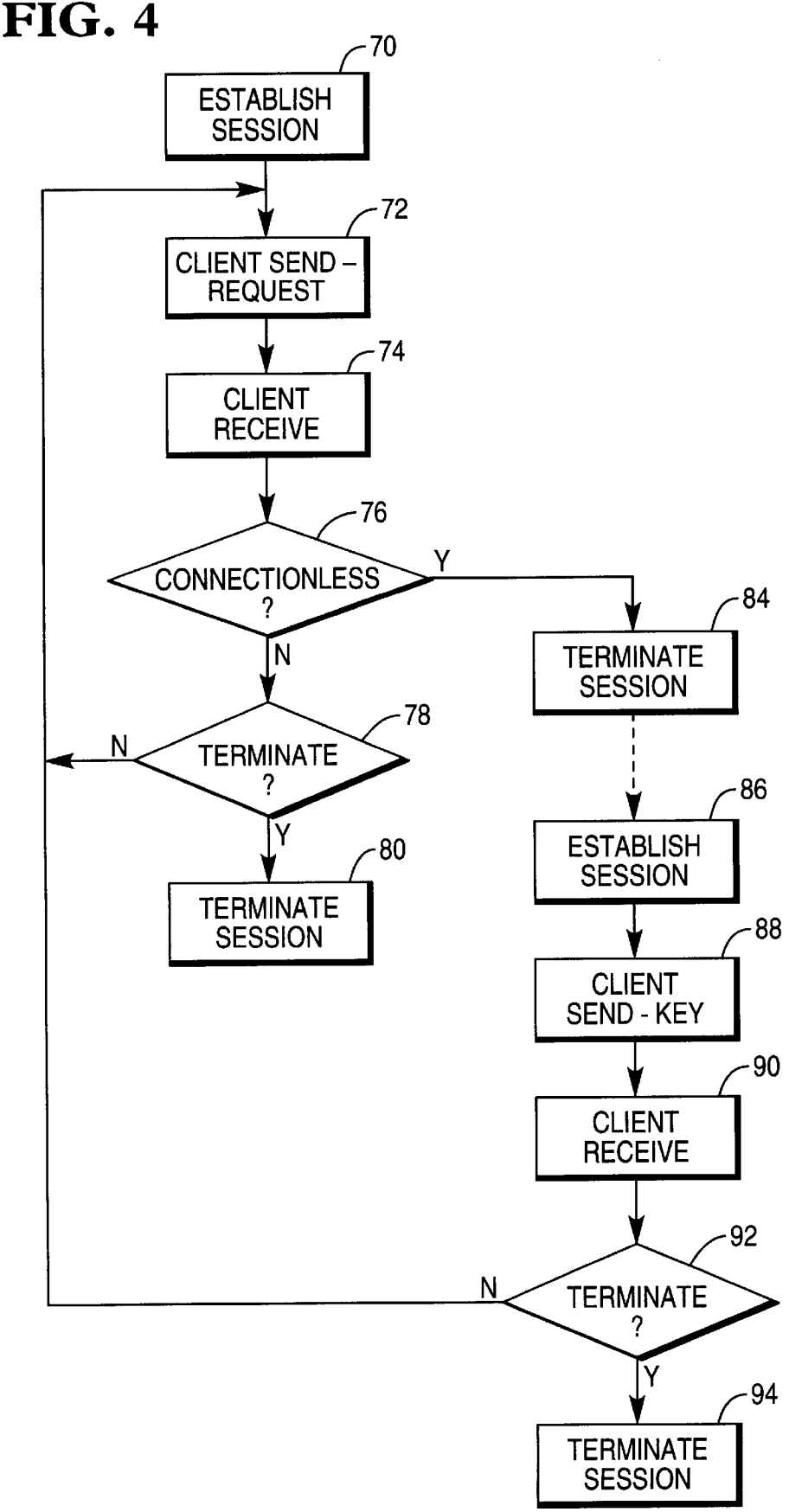
FIG. 4 is a flow chart depicting client application steps in accordance with this invention.
Figure 5:
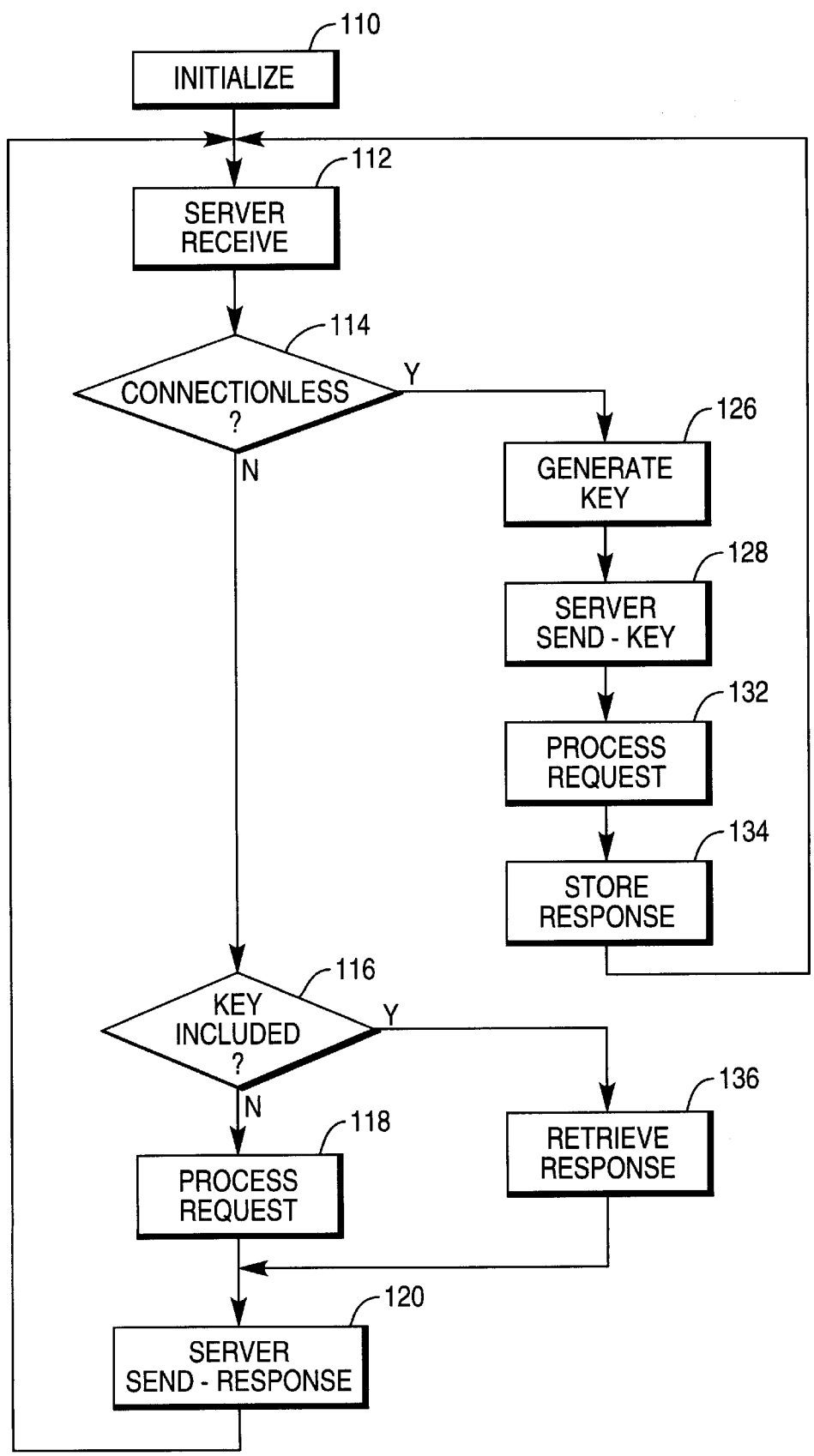
FIG. 5 is a flow chart depicting the steps performed by a server application according to this invention.

Next, turning to FIGS. 2, 4 and 5, the following describes how the process of FIG. 3 is performed in conjunction with one preferred form of middleware, such as TOP END®. FIG. 4 illustrates the steps performed by a client application 34. FIG. 5 illustrates the steps performed by a server application 36. And, FIG. 2 will be used to describe the steps performed by the middleware providing the interface between the client application 34 and the server application 36.

When the server application 36 is started, a call is made to an INITIALIZE routine in the client-server library (CSL) 42, as indicated at block 110 in FIG. 5. The INITIALIZE routine informs the node manager 48 of the application's existence and the services (functions) provided by the application. The node manager 48 in turn informs the other servers 28 within the server system 30 of the application's existence and its services.

The INITIALIZE routine also creates a message queue for the server application 36, on which the server application receives messages. Next, as indicated at block 112, the server application makes SERVER RECEIVE call, another CSL routine. The SERVER RECEIVE routine causes the server application to wait to receive a message. In particular, the server application monitors its message queue.

Turning now to FIG. 4, the client application 34 establishes a client-server session as indicated at block 70. In this step, a communication link between the client 26 and one of the servers 28 is formed by, e.g., a telephone line using modems on the client and the server, unless a communication link already exists. Also during this step, the client application makes an INITIALIZE call, a routine within the remote client library (RCL) 40. The INITIALIZE routine connects the client application process to the middleware. In particular, the INITIALIZE routine sends a message from the client 26 to the server 28.

In response, the server 28 creates a new client agent (CA) process 44. This client agent acts on behalf of the application 34 to send client requests to the node manager and to receive server messages for the client. If the server 28 successfully starts a new client agent 44, the client agent sends a response message back to the client 26, informing the client that the INITIALIZE call was successfully completed. Once a client-server session is successfully established, the client can send requests to the server.

As indicated at block 72, the client application sends a request by making a CLIENT SEND call, i.e., a RCL routine. The CLIENT SEND routine causes a request message to be sent from the client application 34 to the server agent 44. The message: specifies that the client agent 44 is to make a CLIENT SEND call on the client's behalf;

specifies the service the client is requesting; includes any input data from the client; and indicates whether the connectionless processing option is desired. Upon receiving the message, the client agent 44 makes a CLIENT SEND call, i.e., a CSL routine. As a result, the client agent forwards the service request to the node manager 48. After performing the CLIENT SEND routine, the client agent 44 returns a message to the client application indicating whether the CLIENT SEND call was successfully processed.

The node manager in turn determines which server 28 and which server application 36 should process the request, and routes the request onto this server application's queue. If the server application resides on another server, the node manager 48 routes the request through a server agent 46 to the appropriate server, and the node manager 48 on this server then places the request on the server application's queue.

As indicated at block 74, the client application next makes a CLIENT RECEIVE call, another RCL routine, to receive a response message from the server. Upon executing this call, the client 26 sends a message to the client agent 44. The message specifies that the client agent is to make a CLIENT RECEIVE call, a CSL routine. The message also indicates the name of the earlier service request for which the response message is sought. Upon receiving the message, the client agent 44 makes the CLIENT RECEIVE call. The client agent 44 has a message queue in which messages from server applications 36 are placed. As part of the CLIENT RECEIVE routine, the client agent monitors its message queue until a response message is received from the server. That is, the client agent 44 pulls the response message off its message queue, or, if the response message is not yet on the queue, the client agent optionally waits for the response message.

The server application 36 causes the response message, which the client agent seeks, to be placed on the client agent's queue. With respect to FIG. 5, after the server application receives the client request at block 112, the server application 36 parses the request message to determine whether the connectionless processing option is specified, as indicated by decision diamond 114. If connectionless processing was specified, the server application generates a key with which to identify the client request, as indicated at block 126.

The server application then makes a SERVER SEND call, a CSL routine, to send the key to the client application, as indicated at block 128. The node manager 48 has a message queue by which server applications 36 send messages to client applications 34. The SERVER SEND routine places the response message on the node manager's queue. With connectionless processing specified, the response message includes the key assigned to the client request. The node manager 48, in turn, routes the message to the queue of the appropriate client agent 44. As part of the CLIENT RECEIVE call, at block 74, FIG. 4, the client agent 44 removes the message from its queue and sends the message across the network 32 to the client application 34.

After the client application receives the message containing the key, the client application terminates the client-server session, as indicated by decision diamond 76 and block 84. The client application first stores the key for use in later retrieval of the server response message to the client's request. As part of the TERMINATE SESSION step in block 84, the client application makes a TERMINATE call, another RCL routine. The TERMINATE routine causes a message to be sent from the client 26 to the client agent 44, requesting the client agent to itself perform a TERMINATE function. The client agent in turn makes a TERMINATE call, a CSL routine, which causes the client agent process to terminate, thereby freeing up the memory and processor time used by the client agent process. A response message is sent to the client application indicating whether the TERMINATE call was properly processed. During the TERMINATE SESSION step, the client application 34 also terminates the communication link over the network 32 unless, of course, the communication link is still needed for some reason.

Turning once again to FIG. 5, after the SERVER SEND call at block 128, the server application processes the client request and stores a response to be sent to the client at a later point in time, as indicated at blocks 132 and 134.

At some later point in time, the client application 34 establishes another session with the server 28 so that the response to the earlier client request can be retrieved, as indicated at block 86 in FIG. 4. The same process as described with respect to the ESTABLISH SESSION step at block 70 is carried out: a communication link is formed, and a client agent process is started on the server 28. The client application then makes a CLIENT SEND call to send a message containing the previously assigned key to the server, as indicated at block 88. The CLIENT SEND call is carried out in the same manner as described above with respect to the CLIENT SEND step at block 72, except that the message contains the key rather than a client request. The message containing the key is routed through the client agent 44 and the node manager 48 to the server application's queue.

Turning once again to FIG. 5, after the server application has stored its response to the client's request, the server application makes another SERVER RECEIVE call, as indicated at block 112. If a message containing the key from the client is the next message on its queue, the server application 36 parses the message, determines that connectionless processing is not specified for this request, and that a key is included in the request, as indicated at decision diamonds 114 and 116.

Using the key, the server application then retrieves the previously stored response to the client's request, as indicated at block 136. The server application then makes another SERVER SEND call so that the response message will be sent to the client, as indicated at block 120. The SERVER SEND call at block 120 is carried out in the same manner as the SERVER SEND call at block 128, i.e., the response message is routed through the node manager 48 on to the client agent's queue.

The client 26 receives the response message by the client application making a CLIENT RECEIVE call, as indicated at block 90 in FIG. 4. The CLIENT RECEIVE call is carried out in the same manner as the CLIENT RECEIVE call at block 74. The client application then either terminates the client-server session by the TERMINATE SESSION step in the same manner described above with respect to the TERMINATE SESSION step at block 84, or the client application waits to send the next client request, as indicated by decision diamond 92, block 94, and block 72.

If the client request sent at block 72 does not specify the connectionless option, the client-server session is maintained while the server application processes the request. With respect to the server application process in FIG. 5, in this case, the server makes a SERVER RECEIVE call at block 112, in the manner previously described. At decision diamond 114, the server application determines that the connectionless processing option is not specified. At decision diamond 116, the server application determines that the request message does not include a key. The server application then processes the client request, as indicated at block 118. Subsequently, the server application causes a response message to be sent to the client by a SERVER SEND call, as indicated at block 120 and previously described.

The client application makes a CLIENT RECEIVE call so that the response message is received, as indicated at block 74, FIG. 4. Next the client application determines whether the client-server session is to be terminated, as indicated at decision diamonds 76 and 78. If the client-server session is to be terminated, the TERMINATE SESSION step is performed at block 80 in the same manner as described above. On the other hand, if the client-server session is not to be terminated, the client application waits to send the next client request at block 72.

Further details of the invention will now be described. In one preferred embodiment, the following message package structure is used to send information between the client and the server over the network 32. The message structure comprises a header section and a data section:

| HEADER | DATA |
|---|---|

The structure of the header depends upon whether the message is a request from the client or a response from the server. The header structure for a request message includes the following components:
   char version,
   function_id;
   long length;
The "version" and "function_id" components are each character variables. The "version" field specifies the particular version of the client-server communication protocol being used. The "function_id" field identifies the command being issued, e.g., the INITIALIZE, CLIENT SEND, CLIENT RECEIVE, or TERMINATE functions to be performed by the client agent 44. The "length" field is a long-floating point number that specifies the total number of bytes in the message packet, including the header and data sections.

The header structure for response messages includes:
   char version,
   function_id,
   long length,
   status,
   return_code;
The "version," "function_id" and "length" fields are of the same data type and serve the same function as the identically named fields in the request message header. The "status" and "return_code" fields are both long-floating point numbers. The "status" field indicates a status returned by the client agent 44 indicating whether the client agent was able to properly process the message on the client's behalf or whether problems such as unknown function_id, invalid communication protocol version, invalid call request packet length, etc exist. The "return_code" field indicates whether the node manager 48 and/or server application 36 was able to properly process any service requested by the client agent 44.

Turning now to the data section of the message package, the data structure is function specific, i.e., it depends upon the particular command identified by the "function_id" field. For the INITIALIZE function, the data section contains a "system_id" character string that identifies the logical server system with which the client desires to form a session; a logical server system includes a series of server applications. The data section includes another character string "node_name" that identifies the particular server node to which the client desires to be connected. The data section also includes a "appl_id" indicating the particular server application within the logical server system with which the client-server session is to be formed.

After the server executes the INITIALIZE function to form a new client-server session by creating a new client agent 44, the client agent 44 sends a response message back to the client. The response message sent to the client only includes the response header; no data section is included. The response header includes status information that indicates whether the INITIALIZE function was properly performed.

With respect to the CLIENT SEND command, the data section of the message sent from the client to the server includes the client user identification and password, if needed. The name of the service requested of the server application is also included. Whether the connectionless processing option is to be used is also specified in the data section. The data section also includes any user data that needs to be sent along with the client request. When the CLIENT SEND call is made to send a key assigned to an earlier request made using the connectionless processing option, the data section contains the key.

Upon processing the CLIENT SEND message, the client agent 44 sends a response message. The data section of this response message can contain status information beyond that contained in the response header section.

For the CLIENT RECEIVE call, the data section of the message sent from the client to the client agent 44 includes the user identification and password, if needed; the name of the earlier service request for which the response is sought; and the length of the buffer available for receiving the response message. After processing the message, the client agent 44 sends a response message back to the client. If the CLIENT RECEIVE call was made to receive the key assigned to an earlier request, the data section of the response message includes the key and identifies the name of the earlier requested service. On the other hand, if the CLIENT RECEIVE call was made to retrieve the server application's response message to the client's service request, the data section of the response message includes the response generated by the server application and the name of the request service that generated the response.

With respect to the TERMINATE call, the call request message from the client to the network agent and the subsequent response message from the network agent to the client only includes a request header and a response header, respectively. No data section is used.

Other details are now described. In performing connectionless processing of client requests, the server application can store its response for the client, i.e., the step at block 134 in FIG. 5, using various techniques. The response is stored such that it can be accessed with the assigned key. If a database package is available, the response can be stored in a database. Alternatively, the responses can be stored in a flat file.

Various techniques can be used to generate the keys assigned to client requests. The following describes two techniques. With the first technique, a key is generated by combining the name of the requested service and the client input data for the request. For example, in a stock broker management application, if a stock broker using a client 26 requests the daily trading volume of the stock of company ABC in 1994, the key would be:

DailyVolume:ABC:94

"DailyVolume" is the service requested, and "ABC" and "94" are the input data. This approach however does not prevent other client users from obtaining the response stored under this key; other client users need only specify the non-encrypted key to obtain the response. Thus, the approach may not be useful if security is required.

This technique is however particularly useful when clients execute the same requests involving historic information that changes infrequently. In this case, the server-generated response can remain stored even after the response is sent to the client application that made the original request. Then, if the same request is later made, the server application can merely retrieve the previously generated and stored response, rather than repeating the earlier process in which the request was generated. In this manner, processor time is saved.

The second key generation technique is useful where security of the response is required. In this technique, the key is generated by combining the name of the requested service with the user name, user password, the name of the client 26 making the request, and the time at which the request was made. For example, in a banking application, if the user of a client 26 makes a request for the number, date and amount of all the checks written for the user's checking account, the key would be:

ChckngAcctEntries:User:Password:RequestingNode:TimeStamp

"ChckngAcctEntries" is the requested service, "User" is the name of the owner of the checking account, "Password" is the password given to the user, "RequestingNode" is the client 26 that made the request, and "TimeStamp" is the time that the request was made. When a client sends this key to the sever to retrieve the stored response, the server could also ensure that the same client made the original request, to provide a further level of security. After the response is sent to the client, the response is preferably deleted from the server.

Furthermore, the key can be generate by the client application 34 instead of the server application 36. In this case, the client application sends the key along with its request to the server. The server application then stores the key along with its response. When the client later re-establishes a client-server session to receive the stored response, the client application sends the key to the server. The server application then retrieves the stored response and causes the response to be sent to the client, as previously described. As another alternative, the middleware on either the client or server side could generate the response.

A server auto restart feature can also be incorporated into the above described embodiments. In the connectionless processing mode, sometime after the client has terminated the client-server session after receiving the key assigned to the client request (i.e., at the TERMINATE session step 84 in FIG. 4), the middleware system including the node manager 48 on the server 28 may shut down. For example, the system administrator may shut down the middleware system after the client's request is processed to free up memory and eliminate processor overhead. Alternatively, the middleware system could have crashed, shut down automatically, etc. In any of these scenarios, the server auto restart feature would automatically restart the server session when the client attempts to re-establish the client-server session, i.e., at the ESTABLISH SESSION step at block 86.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of providing connectionless processing of client requests of a server, including the steps of:
   (a) forming a client-server connection;
   (b) transmitting a request from a client to a server;
   (c) associating a key with the request for identifying the request;
   (d) terminating the client-server connection;
   (e) processing the request and producing a result at the server; and
   (f) storing the result at the server for later reporting to the client when the client identifies the request by the associated key.

2. The method of claim 1, further including the steps of:
   forming a second client-server connection;
   transmitting the key from the client to the server; and
   transmitting the result to the client.

3. The method of claim 1, wherein the step of associating a key with the request includes the server generating the key and transmitting the key to the client.

4. The method of claim 1, wherein the method of providing connectionless processing of client requests of a server is an optional alternative to processing of client requests while maintaining a client-server connection, wherein the connectionless processing option is specified in the step of transmitting a request from a client to a server.

5. The method of claim 2, wherein the method of providing connectionless processing of client requests of a server is an optional alternative to processing of client requests while maintaining a client-server connection, wherein the connectionless processing option is specified in the step of transmitting a request from a client to a server.

6. The method of claim 5, wherein the step of associating a key with the request includes the server generating the key and transmitting the key to the client.

7. A computer readable program storage medium tangibly embodying a program of instructions, executable by a computer to achieve connectionless processing of client requests of a server, to perform the steps of:
   (a) forming a client-server connection;
   (b) receiving a request from a client;
   (c) associating a key with the request for identifying the request;
   (d) terminating the client-server connection;
   (e) processing the request and producing a result at the server; and
   (f) storing the result at the server for later reporting to the client when the client identifies the request by the associated key.

8. The computer readable program storage medium of claim 7, wherein said program of instructions includes further instructions to perform the steps of:
   forming a second client-server connection;
   receiving the key from the client; and
   transmitting the result to the client.

9. The computer readable program storage medium of claim 7, wherein the step of associating a key with the request includes generating the key and transmitting the key to the client.

10. The computer readable program storage medium of claim 7, wherein the connectionless processing of client requests of a server is an optional alternative to processing of client requests while maintaining a client-server connection, wherein the connectionless processing option is specified in the step of receiving a request from a client.

11. The computer readable program storage medium of claim 8, wherein the connectionless processing of client requests of a server is an optional alternative to processing of client requests while maintaining a client-server connection, wherein the connectionless processing option is specified in the step of receiving a request from a client.

12. The computer readable program storage medium of claim 11, wherein the step of associating a key with the request includes the server generating the key and transmitting the key to the client.

13. A computer readable program storage medium tangibly embodying a program of instructions, executable by a computer to achieve connectionless processing of client requests of a server, to perform the steps of:

(a) forming a first client-server connection;

(b) transmitting a request to a server;

(c) associating a key with the request for identifying the request;

(d) terminating the client-server connection;

(e) forming a second client-server connection;

(f) transmitting the key to the server; and (g) receiving from the server a result of the server processing the request.

14. The computer readable program storage medium of claim 13, wherein the step of associating a key with the request includes receiving from the server the key associated with the request.

15. The computer readable program storage medium of claim 13, wherein the connectionless processing of client requests of a server is an optional alternative to processing of client requests while maintaining a client-server connection, wherein the connectionless processing option is specified in the step of transmitting a request to a server.

16. The computer readable program storage medium of claim 14, wherein the connectionless processing of client requests of a server is an optional alternative to processing of client requests while maintaining a client-server connection, wherein the connectionless processing option is specified in the step of transmitting a request to a server.

17. An apparatus configured as a server for providing connectionless processing of client requests, the apparatus including:

a processor; and a data storage device coupled to the processor;

wherein the processor and the storage device are configured to form a client-server connection, receive a request from a client, associate a key with the request for identifying the request, terminate the client-server connection, process the request and produce a result at the server, and store the result at the server for later reporting to the client when the client identifies the request by the associated key.

18. The apparatus of claim 17, wherein the processor and the data storage device are configured to:

form a second client-server connection;

receive the key from the client; and transmit the result to the client.

19. The apparatus of claim 17, wherein the processor and the data storage device are configured to generate the key and transmit the key to the client.

20. The apparatus of claim 17, wherein the processor and the data storage device are configured so that the connectionless processing of client requests of a server is an optional alternative to processing of client requests while maintaining a client-server connection, wherein the connectionless processing option is followed when specified in the request from the client.

21. The apparatus of claim 18, wherein the processor and the data storage device are configured so that the connectionless processing of client requests of a server is an optional alternative to processing of client requests while maintaining a client-server connection, wherein the connectionless processing option is followed when specified in the request from the client.

22. The apparatus of claim 21, wherein the processor and the data storage device are configured to generate the key and transmit the key to the client.

23. An apparatus configured as a client for providing connectionless processing of client requests, the apparatus including:

a processor; and a data storage device coupled to the processor;

wherein the processor and the storage device are configured to form a first client-server connection, transmit a request to a server, associate a key with the request for identifying the request, terminate the client-server connection, form a second client-server connection, transmit the key to the server, and receive from the server a result of the server processing the request.

24. The apparatus of claim 23, wherein the processor and the data storage device are configured to receive from the server the key associated with the request.

25. The apparatus of claim 23, wherein the processor and the data storage device are configured so that the connectionless processing of client requests of a server is an optional alternative to processing of client requests while maintaining a client-server connection, wherein the connectionless processing option is specified in the request transmitted to the server.

26. The apparatus of claim 24, wherein the processor and the data storage device are configured so that the connectionless processing of client requests of a server is an optional alternative to processing of client requests while maintaining a client-server connection, wherein the connectionless processing option is specified in the request transmitted to the server.

* * * * *